United States Patent
Irie et al.

(10) Patent No.: US 7,899,108 B2
(45) Date of Patent: Mar. 1, 2011

(54) RECEIVING APPARATUS, ELECTROMAGNETIC WAVE TIMEPIECE, RECEIVING MODULE AND RECEIVING METHOD

(75) Inventors: Michio Irie, Suwa (JP); Hiromitsu Mizukami, Shiojiri (JP)

(73) Assignee: Seiko Epson Corporation (JP)

( * ) Notice: Subject to any disclaimer, the term of this patent is extended or adjusted under 35 U.S.C. 154(b) by 684 days.

(21) Appl. No.: 11/940,541

(22) Filed: Nov. 15, 2007

(65) Prior Publication Data

US 2008/0159456 A1 Jul. 3, 2008

(30) Foreign Application Priority Data

Dec. 28, 2006 (JP) ................................. 2006-353824
Sep. 20, 2007 (JP) ................................. 2007-243438

(51) Int. Cl.
*H04B 1/00* (2006.01)
(52) U.S. Cl. ......... 375/149; 375/147; 375/140; 375/130; 370/319; 370/320; 370/321; 370/330; 370/335; 370/342; 370/347
(58) Field of Classification Search ................... 375/149, 375/147, 140, 130; 370/319–321, 330, 335, 370/342, 347
See application file for complete search history.

(56) References Cited

U.S. PATENT DOCUMENTS

2005/0266844 A1* 12/2005 Narasimha ................ 455/435.2

FOREIGN PATENT DOCUMENTS

JP 2000-321383 11/2000

* cited by examiner

*Primary Examiner* — David C Payne
*Assistant Examiner* — Zewdu Kassa
(74) *Attorney, Agent, or Firm* — Harness, Dickey & Pierce, P.L.C.

(57) ABSTRACT

A receiving apparatus includes: a receiver receiving a communication signal from a base station and including pilot and sync channel signals in which predetermined data strings continue periodically; a synchronizer acquiring synchronization information for communicating with the base station from the pilot channel signal and, based on the synchronization information, synchronizing with the communication signal; a data acquirer demodulating the sync channel signal from the synchronized communication signal and, by decoding the demodulated sync channel signal, acquiring sync channel signal data; an inference unit inferring a location in the data string of the acquired data by comparing the acquired data with data acquired and held before the acquired data and including the data string; a calculator calculating a time until receiving a next data string head from the inferred location in the data string; and a controller halting the reception of the communication signal based on the calculated time.

8 Claims, 9 Drawing Sheets

FIG. 1

Sync channel message format

| Field | Bit quantity | Block |
|---|---|---|
| MSG_LENGTH | 8 | 1 |
| MSG_TYPE | 8 | 1 |
| P_REV | 8 | 1 |
| MIN_P_REV | 8 | 1 |
| SID | 15 | 2 |
| NID | 16 | 2 |
| PILOT_PN | 9 | 3 |
| LC_STATE | 42 | 4 |
| SYS_TIME | 36 | 5 |
| LP_SEC | 8 | 6 |
| LTM_OFF | 6 | 6 |
| DAYLT | 1 | 6 |
| PRAT | 2 | 6 |
| CDMA_FREQ | 11 | 7 |
| EXT_CDMA_FREQ | 11 | 7 |
| CRC | 30 | 8 |

RECEIVING APPARATUS, ELECTROMAGNETIC WAVE TIMEPIECE, RECEIVING MODULE AND RECEIVING METHOD

BACKGROUND

1. Technical Field

The present invention relates to a receiving apparatus, an electromagnetic wave timepiece, a receiving module, and a receiving method, which receive a communication signal including time information.

2. Related Art

In an electromagnetic wave timepiece which receives time signal transmitted by means of an electromagnetic wave, and displays accurate time information, a method has been known which receives a standard frequency, in a low frequency band, transmitted from a ground base station, or a time signal, in an ultrahigh frequency band, transmitted from a GPS (Global Positioning System) satellite. Furthermore, recently, as described in JP-A-2000-321383, a timepiece has been proposed which acquires an accurate time by receiving a time signal, included in an electromagnetic wave in an ultrahigh frequency band, which is CDMA (Code Division Multiple Access) modulated and transmitted for the purpose of mobile communication. It has been known that this kind of electromagnetic wave in the ultrahigh frequency band, as it is relayed far and wide by various kinds of repeater, can be received in a good condition even at various movement destinations, such as an inside of a building or underground, in comparison with the standard frequency in the low frequency band, and the electromagnetic wave from the GPS satellite. Also, it has been known that a timepiece which receives a CDMA electromagnetic wave, after demodulating a pilot channel signal and obtaining synchronization with the base station at a reception start time, by demodulating and decoding a sync channel signal, can acquire time information including GPS time, leap second, local offset and daylight-saving time information, and the like.

In the case in which the timepiece receives the CDMA electromagnetic wave, demodulates the pilot channel signal and, after obtaining the synchronization with the base station, decodes the sync channel signal, and acquires the time information, as data strings including the time information continue in regular periods in the sync channel signal, in order to extract the time information from the data strings, it has been necessary to acquire data in a data string from its head. Consequently, the time information has been extracted by detecting the head of the data string from among the decoded data, and acquiring the data from the detected head. However, it has been necessary to continue a receiving operation even for a time period from acquiring initially demodulated sync channel data until acquiring data at the head of a next data string. Consequently, as considerable power is consumed by continuing the receiving operation, it has been difficult to reduce a power consumption of an information processor including this kind of timepiece.

SUMMARY

An advantage of some aspects of the invention is to solve at least a portion of the heretofore described problem.

A receiving apparatus according to an aspect of the invention includes: a receiver which receives a communication signal, transmitted from a base station by a predetermined communication method, which includes a pilot channel signal and a sync channel signal in which predetermined data strings continue periodically; a synchronizer which acquires synchronization information for communicating with the base station from the pilot channel signal included in the communication signal and, based on the acquired synchronization information, obtains synchronization with the communication signal; a data acquirer which demodulates the sync channel signal from the communication signal with which the synchronization has been obtained and, by decoding the demodulated sync channel signal, acquires data of the sync channel signal; an inference unit which, by comparing the acquired data with data, including the data string, which are acquired before the acquired data and held, infers a location in the data string of the acquired data; a calculator which, from the inferred location in the data string, calculates a time period required until receiving a head of a next data string; and a controller which, based on the calculated time period, controls a halt of an operation relating to the reception of the communication signal.

According to this kind of configuration, the synchronization information is acquired from the pilot channel signal included in the received communication signal, the synchronization with the communication signal is obtained based on the acquired synchronization information, and data of the sync channel signal included in the communication signal are decoded and acquired. Continuing, the location in the data string of the acquired data is inferred by comparing the acquired data with data, in the data string, which are acquired before the acquired data and held. Continuing, the time period required until receiving the head of the next data string is calculated from the inferred location, and the receiving operation of receiving the communication signal is halted in accordance with the calculated time period. As a result, the receiving operation is halted over a time period starting from obtaining the synchronization by means of the pilot channel signal and acquiring the data from the sync channel signal until receiving the head of the next data string. Consequently, as power consumed for the time period is reduced, it is possible to reduce a power consumption of the receiving apparatus.

In the receiving apparatus of the aspect of the invention, it is also acceptable that the inference unit includes a memory which stores the data string which acts as a reference, and a comparator which compares the acquired data and the stored data string.

In the receiving apparatus of the aspect of the invention, it is preferable that the data string includes one data area which includes at least information relating to a time, and another data area in which data is less likely to be updated in response to an elapse of time, and that the inference unit which determines whether or not the acquired data are included in the one data area by using a first area as a comparison object, and determines whether or not the acquired data are included in the other data area by using a second area as a comparison object, wherein the first area is included in the information relating to the time indicated by the acquired data and is less frequently updated, and the second area is included in information indicating a predetermined disposition pattern in the acquired data.

According to the aspect of the invention, as well as it being possible, by using as a comparison object an area, from the information relating to the time, in which the data is less frequently updated, to compare pieces of data including the time information with each other without being affected by a fluctuation of the time, it is possible, by using an area indicating the predetermined disposition pattern as a comparison object, to accurately compare pieces of data which do not include the time information with each other.

In the receiving apparatus of the aspect of the invention, it is preferable that the controller, in the event that the calculated time period is shorter than a reference value, does not instruct the halt of the operation relating to the reception.

According to the aspect of the invention, as the receiving operation is not halted in the event that a time period for which the receiving operation is halted is shorter than the reference value, it is possible to prevent a data acquisition error due to a delay when switching the operation.

In the receiving apparatus of the aspect of the invention, it is also acceptable that the predetermined communication method is a CDMA communication method. Then, by applying the receiving apparatus to an electromagnetic wave timepiece, it is possible to provide an electromagnetic wave timepiece of a low power consumption.

A receiving module according to another aspect of the invention includes: a receiver which receives a communication signal, transmitted from a base station by a predetermined communication method, which includes a pilot channel signal and a sync channel signal in which predetermined data strings continue periodically; a synchronizer which acquires synchronization information for communicating with the base station from the pilot channel signal included in the communication signal and, based on the acquired synchronization information, obtains synchronization with the communication signal; a data acquirer which demodulates the sync channel signal from the communication signal with which the synchronization has been obtained and, by decoding the demodulated sync channel signal, acquires data of the sync channel signal; an inference unit which, by comparing the acquired data with data, including the data string, which are acquired before the acquired data and held, infers a location in the data string of the acquired data; a calculator which, from the inferred location in the data string, calculates a time period required until receiving a head of a next data string; and a controller which, based on the calculated time period, controls a halt of an operation relating to the reception of the communication signal.

According to this kind of configuration, the synchronization information is acquired from the pilot channel signal included in the received communication signal, the synchronization with the communication signal is obtained based on the acquired synchronization information, and data of the sync channel signal included in the communication signal are decoded and acquired. Continuing, the location in the data string of the acquired data is inferred by comparing the acquired data with data, in the data string, which are acquired before the acquired data and held. Continuing, the time period required until receiving the head of the next data string is calculated from the inferred location, and the receiving operation of receiving the communication signal is halted in accordance with the calculated time period. As a result, the receiving operation is halted over the time period starting from obtaining the synchronization by means of the pilot channel signal and acquiring the data from the sync channel signal until receiving the head of the next data string. Consequently, as power consumed for the time period is reduced, it is possible to reduce the power consumption of the receiving apparatus.

A receiving method according to a further aspect of the invention includes: receiving a communication signal, transmitted from a base station by a predetermined communication method, which includes a pilot channel signal and a sync channel signal in which predetermined data strings continue periodically; acquiring synchronization information for communicating with the base station from the pilot channel signal included in the communication signal and, based on the acquired synchronization information, obtaining synchronization with the communication signal; demodulating the sync channel signal from the communication signal with which the synchronization has been obtained and, by decoding the demodulated sync channel signal, acquiring data of the sync channel signal; by comparing the acquired data with data, including the data string, which are acquired before the acquired data and held, inferring a location in the data string of the acquired data; from the inferred location in the data string, calculating a time period required until receiving a head of a next data string; and based on the calculated time period, controlling a halt of an operation relating to the reception of the communication signal.

According to this kind of method, the synchronization information is acquired from the pilot channel signal included in the received communication signal, the synchronization with the communication signal is obtained based on the acquired synchronization information, and data of the sync channel signal included in the communication signal are decoded and acquired. Continuing, the location in the data string of the acquired data is inferred by comparing the acquired data with data, in the data string, which are acquired before the acquired data and held. Continuing, the time period required until receiving the head of the next data string is calculated from the inferred location, and the receiving operation of receiving the communication signal is halted in accordance with the calculated time period. As a result, the receiving operation is halted over the time period starting from obtaining the synchronization by means of the pilot channel signal and acquiring the data from the sync channel signal until receiving the head of the next data string. Consequently, as power consumed for the time period is reduced, it is possible to reduce the power consumption of the receiving apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a description will be given of embodiments of the invention, with reference to the drawings.

Embodiment 1

Figure 1:
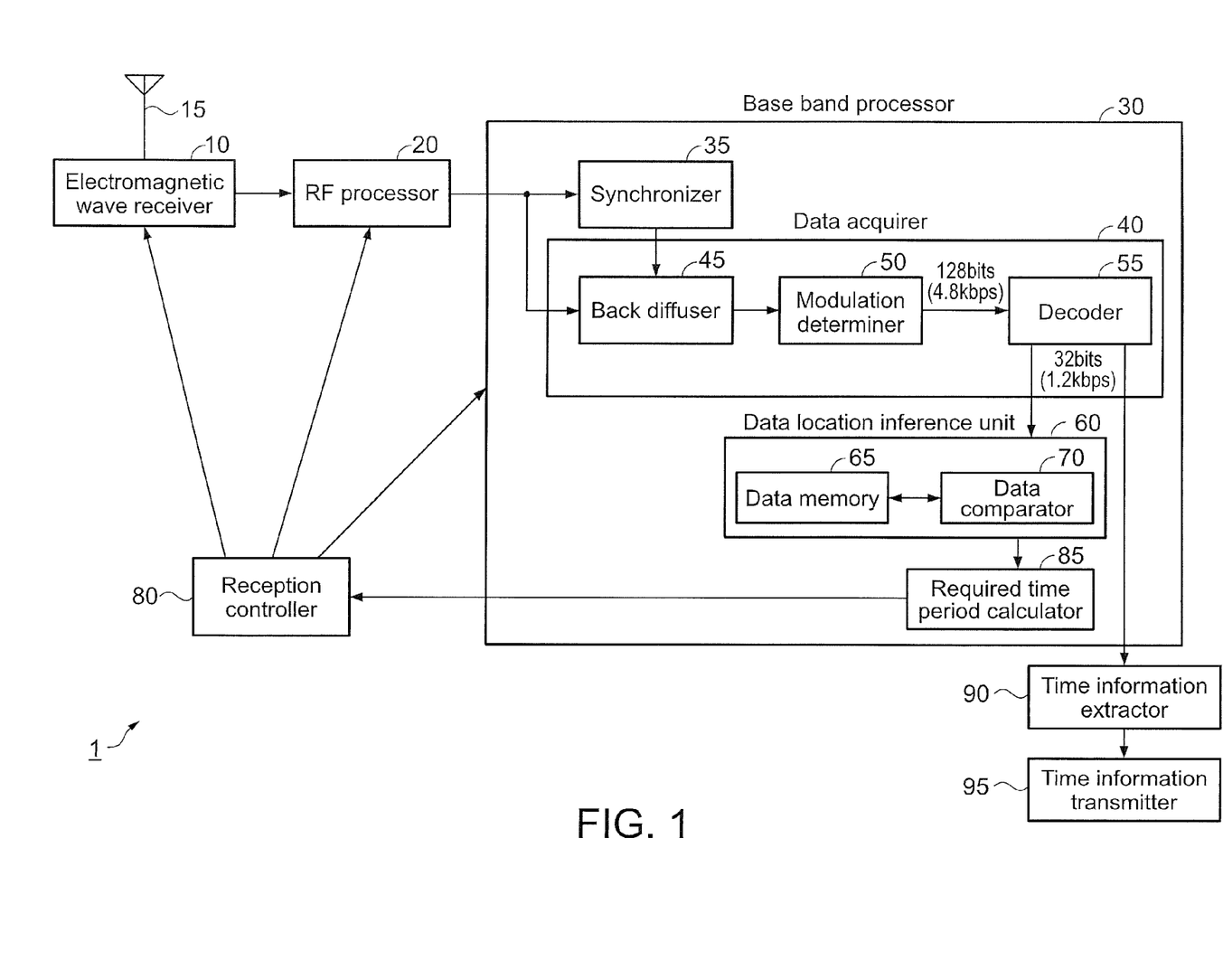
FIG. 1 is a block diagram showing a configuration of an electromagnetic wave timepiece according to an embodiment 1 of the invention.

FIG. 1 is a block diagram showing a configuration of an electromagnetic wave timepiece 1 to which is applied a receiving apparatus according to an embodiment 1. The electromagnetic wave timepiece 1 receives time information, included in an electromagnetic wave in an ultrahigh frequency band, which is CDMA-modulated and transmitted, and displays an accurate time which the time information has. The electromagnetic wave timepiece 1 includes an electromagnetic wave receiver 10 which uses an antenna 15 to receive the electromagnetic wave with the time information CDMA-modulated and transmitted, an RF processor 20 which, as well as converting a high frequency signal of the electromagnetic wave received by the electromagnetic wave receiver 10 into a base band signal, AD-converts it into a digital signal, a base band processor 30 which decodes data including the time information by subjecting two orthogonal phase digital signals (an I signal and a Q signal) to a CDMA demodulation process, a time information extractor 90 which extracts the information relating to the time from the decoded data, a time information transmitter 95 which transmits the extracted time information, and a reception controller 80 which controls a receiving function of the electromagnetic wave timepiece 1.

The base band processor 30 includes a synchronizer 35, a data acquirer 40, a data location inference unit 60 and a required time period calculator 85. The synchronizer 35 acquires synchronization information, which is for obtaining synchronization with a digital signal from a base station, from a pilot channel signal included in the high frequency signal and, based on the synchronization information, obtains the synchronization with the digital signal from the base station. Also, the data acquirer 40 has a function which demodulates a sync channel signal from the digital signal with which the synchronization has been obtained and, by decoding the demodulated sync channel signal, acquires data of the sync channel signal. The data acquirer 40 includes a back diffuser 45, a modulation determiner 50 and a decoder 55. Furthermore, the data location inference unit 60 has a function which, by comparing the data of the sync channel signal sent from the data acquirer 40 with data, in a data string, which are acquired before the data and held, infers a location in the data string of the acquired data. The data location inference unit 60 includes a data memory 65 and a data comparator 70.

In the embodiment 1, the I signal and the Q signal are input into the synchronizer 35 and the back diffuser 45, respectively. The synchronizer 35 obtains a timing synchronization of a short period PN code from the base band signal in order to identify the base station, and notifies the back diffuser 45 thereof. The back diffuser 45, based on the timing synchronization of which it has been notified, as well as multiplying the I signal and the Q signal by the short period PN code, demodulates the pilot channel signal by multiplying it by a Walsh code 0, which is a channelization code, and integrating a product, and demodulates the sync channel signal by multiplying it by a Walsh code 32 and integrating a product. The pilot channel signal is used to obtain synchronization between the base station and a receiver. The sync channel signal is used for the base station to give notice of the time information, system setting information and the like. The modulation determiner 50 eliminates a phase rotation by means of the pilot channel signal, and determines binary phase shift keying (BPSK) data of the sync channel signal. The decoder 55 brings a data order, rearranged by a repeater and an interleaver at a time of a data transmission from the base station, back into an original order by means of a deinterleaver and a derepeater. Furthermore, the decoder 55 restores data transmitted in units of 128 bits to 32-bit unit data by subjecting them to a process, a reverse of a convolution coding process to which they have been subjected at the transmission time, by means of an error correction processor omitted from the figure. The sync channel signal, from among the data decoded by the data acquirer 40, is sent to the data location inference unit 60 and the time information extractor 90. In the embodiment 1, a configuration is such that the sync channel signal is sent to the data location inference unit 60 in a case in which a location in a data string of initially decoded data is unknown, as in a start of a receiving process by means of the electromagnetic wave timepiece 1. Meanwhile, a configuration is such that the sync channel signal is sent to the time information extractor 90 in a case in which the location in the data string is given, or in a kind of case in which the location in the data string cannot be accurately inferred.

Figure 2:
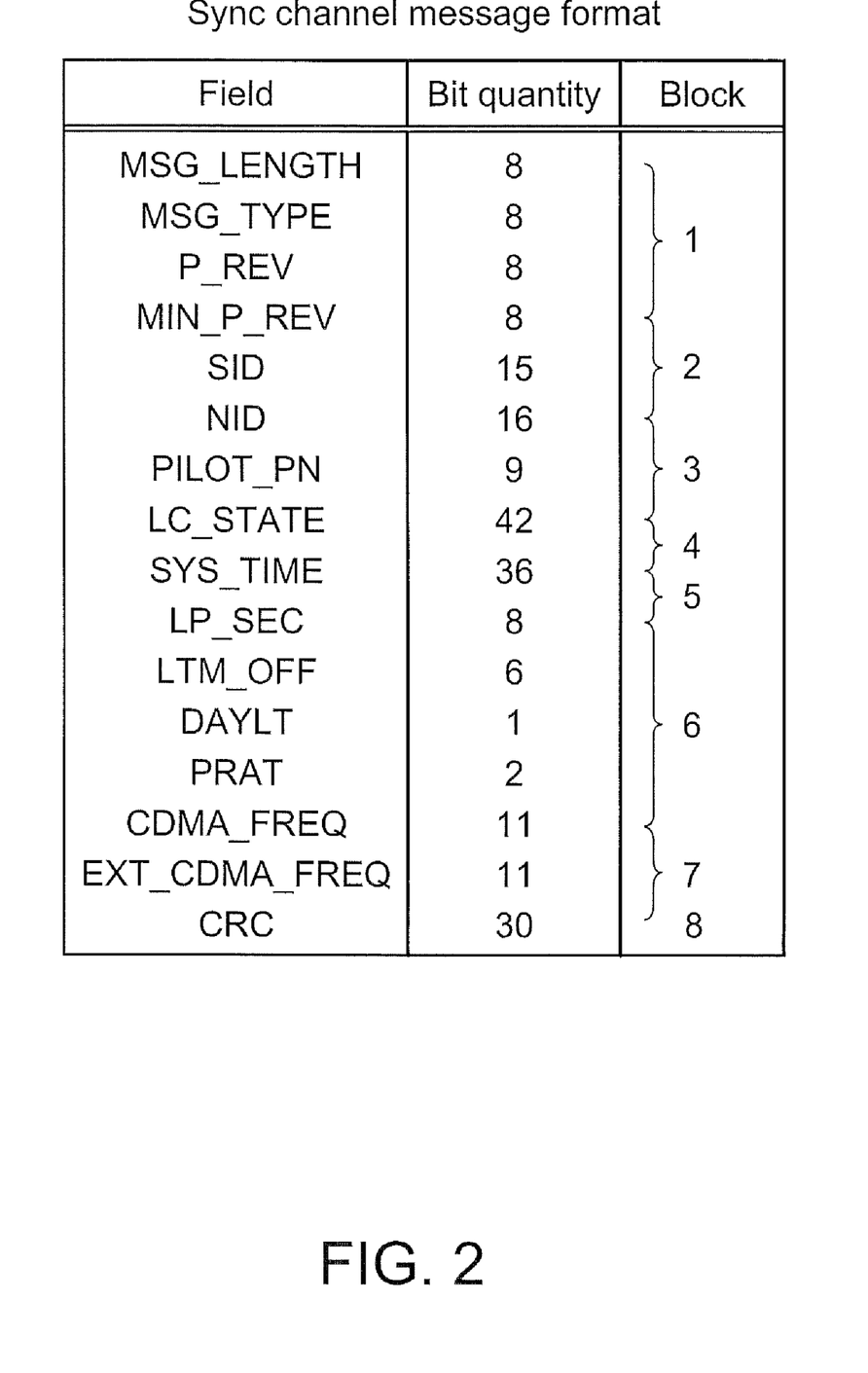
FIG. 2 is a diagram illustrating data areas of message data of a sync channel signal.
Figure 3:
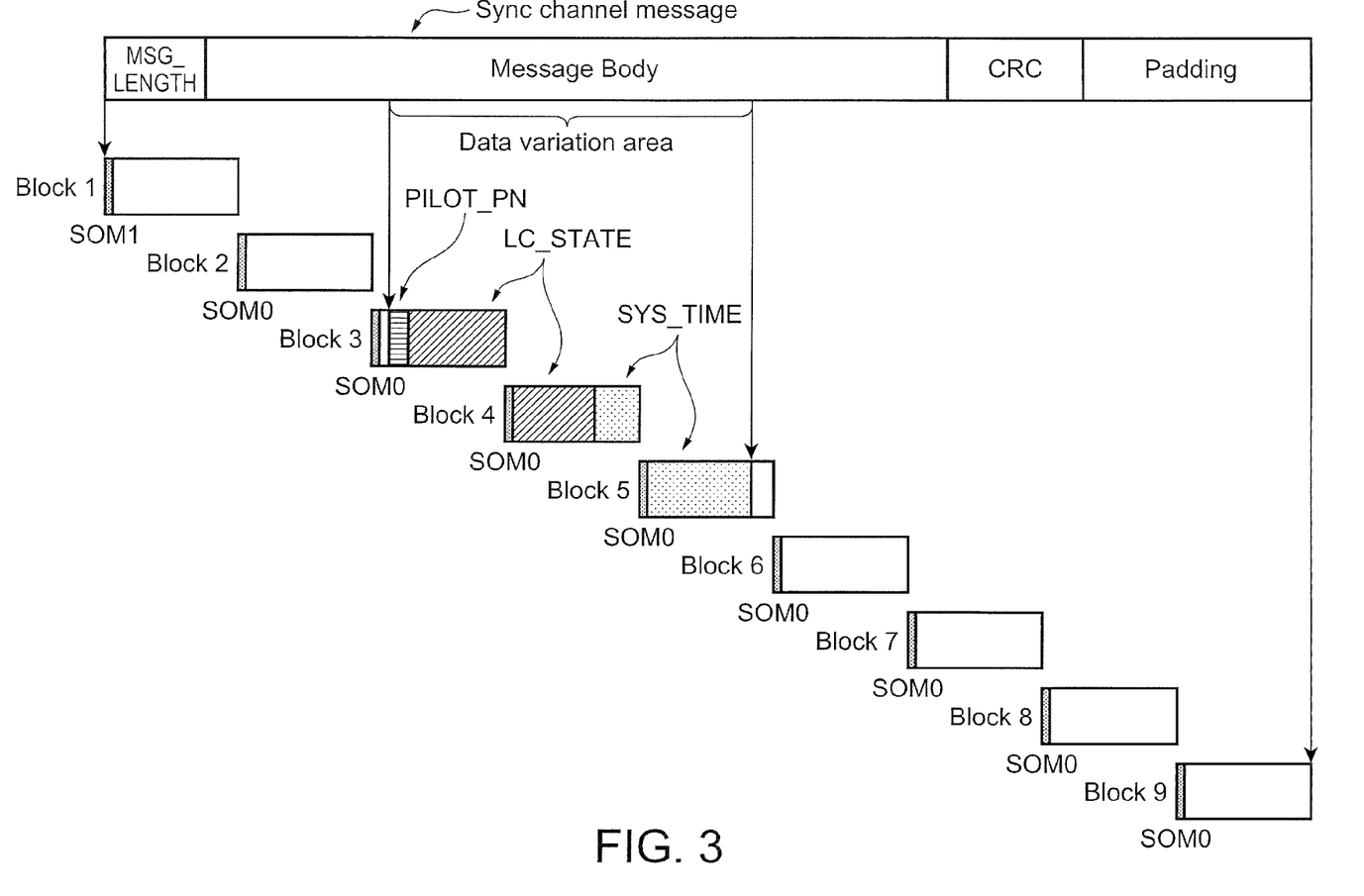
FIG. 3 is a diagram illustrating a data breakdown of the message data of the sync channel signal.

Herein, a description will be given of a data configuration of the sync channel signal, with reference to FIGS. 2 and 3. FIG. 2 is a diagram illustrating data areas of message data of the sync channel signal. Also, FIG. 3 is a diagram illustrating a breakdown of the message data of the sync channel signal. The message data of the sync channel signal consists of data strings continuing in regularly repeated periods. As shown in FIG. 2, one data string includes a plurality of fields, each of which is defined by a predetermined number of bits. Of these fields, PILOT_PN for identifying the base station, LC_STATE which is a parameter for a telephone call, and SYS_TIME including the time information, are fields of which data values are very highly likely to fluctuate every time the message data are acquired. Meanwhile, the other fields are fields of which data are less likely to be updated in response to an elapse of time. They are fields of which data values are very highly likely to be approximately the same, particularly in a case in which continuous message data are acquired. Of these fields, fields from which MSG_LENGTH and CRC are excluded, being called MessageBody, are defined by a range of 2 to 1146 bits. CRC is a code string for checking a bit data error in MSG_LENGTH and MessageBody.

As shown in FIG. 3, the message data of the sync channel signal is configured of MSG_LENGTH, MessageBody, CRC and Padding. As the message data of the sync channel signal are configured in units of 93 bits, a length of one item of message data is an integral multiple of 93 bits. Padding is data configured of 0 bits in order to secure this data length. Also, as shown in FIG. 3, the data of the sync channel signal are divided into nine 32-bit unit blocks, and an SOM (Start Of Message) bit indicating a head of each block is added to the head. A bit (SOM1) indicating a head of the data strings of the message data, and a bit (SOM0) indicating a head of each block, are defined in the SOM bits. The fields, of which the data values are very highly likely to fluctuate, are included in a block 3, a block 4 and a block 5, from among the blocks.

Returning to FIG. 1, in the data comparator 70, the data of the sync channel signal input into the data location inference unit 60 are compared with data, in a reference data string, which are stored in the data memory 65. As a result, a location in a data string of the input data, that is, a message data field to which the input data belong, is inferred. In the embodiment 1, the data comparator 70 compares the pieces of data, by using as a comparison object a data area, from among the information relating to the time indicated by the acquired data, in which the data are less frequently updated. As a result of the comparison, the data location inference unit 60 determines whether or not the acquired data are included in the fields in which the data values are very highly likely to fluctuate. Meanwhile, the data comparator 70 compares the pieces of data, by using as a comparison object a data area, from among the acquired data, which indicates a predetermined disposition pattern. As a result of the comparison, the data location inference unit 60 determines whether or not the acquired data are included in the fields of which the data are less likely to be updated in response to the elapse of time. By applying these determinations to each field, the data location inference unit 60 infers the location in the data string. Information relating to the inferred location in the data string is sent to the required time period calculator 85. Details of a data comparison in each field of a data string will be described hereafter.

The required time period calculator 85 calculates, from the information relating to the inferred location in the data string, a time period required until receiving a head of a next data string. In the embodiment 1, a data string length and a data transmission speed are given. Consequently, in the event that a location in a data string of the initially decoded data can be inferred, it is possible to calculate a time period required until the head of the next data string is demodulated. For example, in the embodiment 1, where the data string of the sync channel signal is 1146 bits and the transmission speed is 1.2 kbps, approximately one second is required from the head to a tail of the data string. Consequently, the time period required until receiving the head of the next data string is a value of one second or less and, in the embodiment 1, a configuration is such as to enable a calculation of a predetermined precision. Information relating to the time period calculated by the required time period calculator 85 is sent to the reception controller 80.

The reception controller 80, based on the time period calculated by the required time period calculator 85, controls a halt of an operation relating to a reception of the sync channel signal. In the embodiment 1, the reception controller 80 is configured in such a way as to be able to control at least one of functional portions, the electromagnetic wave receiver 10, the RF processor 20 or the base band processor 30, with a high precision.

It is also acceptable that each above mentioned functional portion is realized by means of an electric circuit or, being configured of a CPU (Central Processing Unit), a RAM (Random Access Memory), a ROM (Read Only Memory), a memory card and the like, is realized in conjunction with these hardware and software, although they are omitted from the figure.

Figure 4:
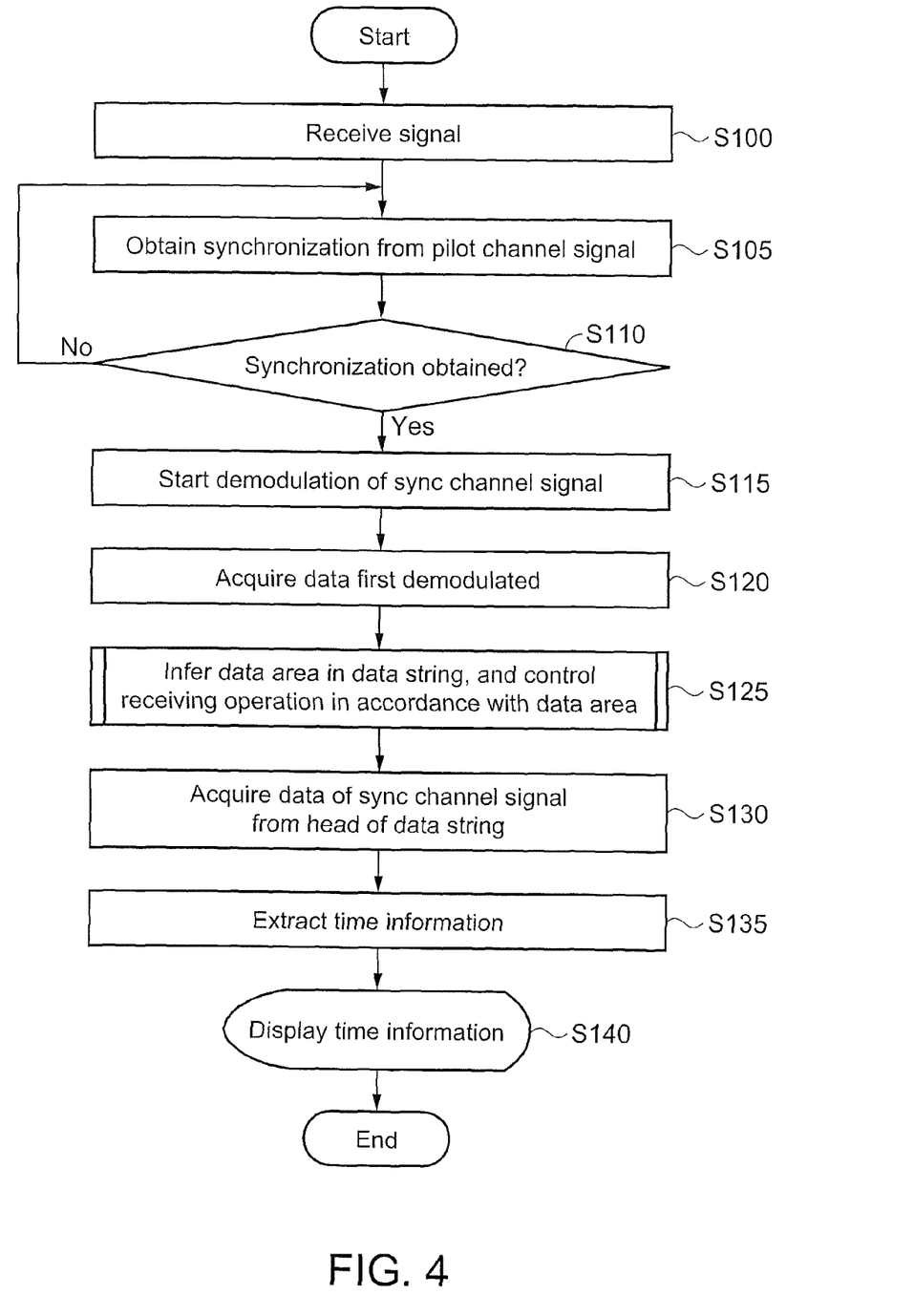
FIG. 4 is a flowchart illustrating a flow of a process in which time information is displayed by the electromagnetic wave timepiece according to the embodiment 1 of the invention.
Figure 5:
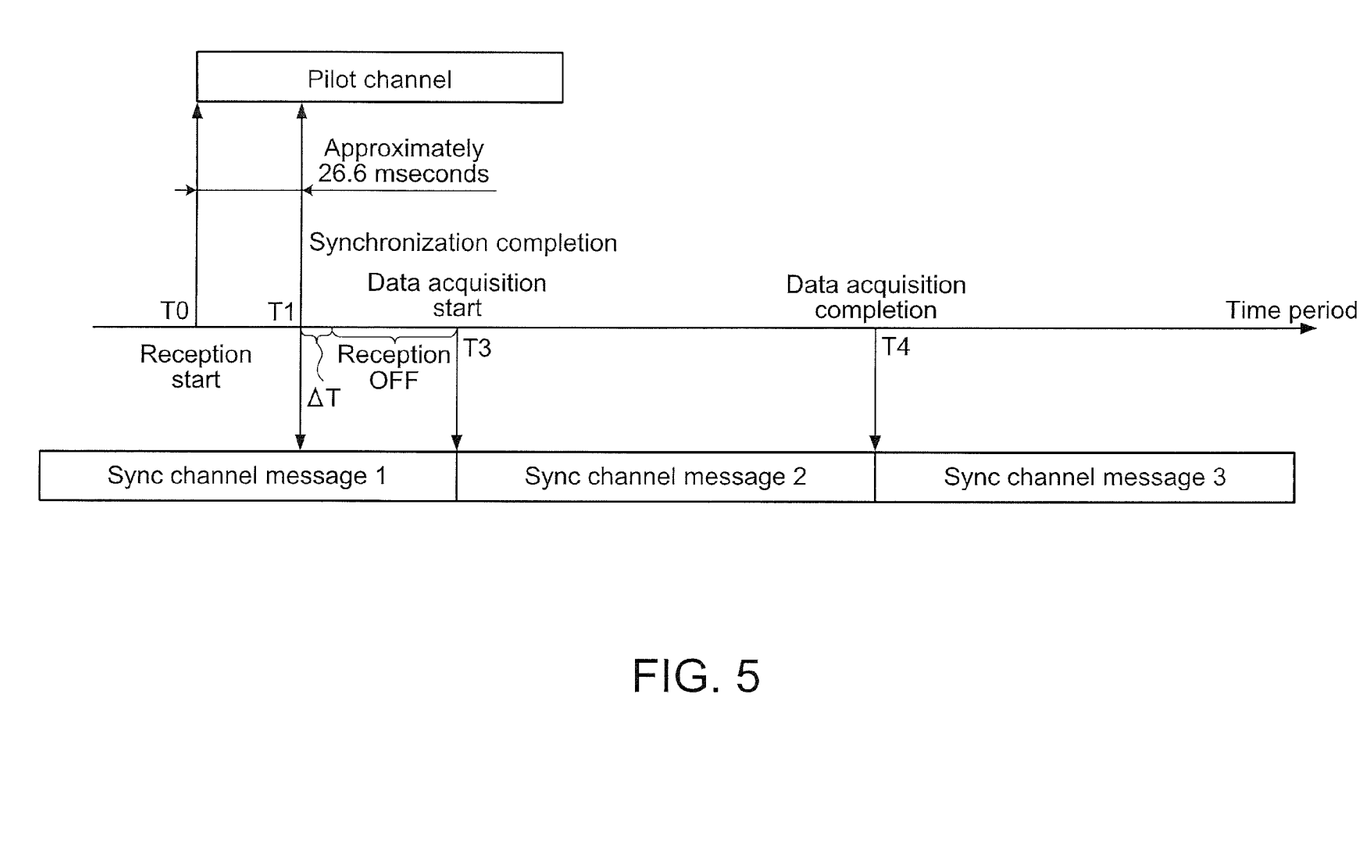
FIG. 5 is a diagram illustrating a relationship between a pilot channel signal and the sync channel signal.

FIG. 4 is a flowchart illustrating a flow of a process in which the time information is displayed by the electromagnetic wave timepiece 1. Also, FIG. 5 is a diagram illustrating a relationship between the pilot channel signal and the sync channel signal. In order to facilitate a description and understanding of the flowchart in FIG. 4, a description will be given with reference to FIG. 5 too. When the process is started, first, in step S100, the electromagnetic wave timepiece 1 receives a CDMA-modulated signal including the time information (T0 in FIG. 5). Next, in step S105, the electromagnetic wave timepiece 1 demodulates the pilot channel signal from the received signal, and obtains synchronization.

Next, in step S110, the electromagnetic wave timepiece 1 determines whether or not it has obtained the synchronization with the received signal. Herein, if it cannot obtain the synchronization with the received signal (No in step S110), the electromagnetic wave timepiece 1 returns to step S105, and waits until it can obtain the synchronization. In the embodiment 1, approximately 26.6 mseconds are required from starting a reception of the pilot channel signal until obtaining the synchronization. Contrarily, if it can obtain the synchronization with the received signal (Yes in step S110), in step S115, the electromagnetic wave timepiece 1 starts a demodulation of the sync channel signal included in the received signal (T1 in FIG. 5).

Next, in step S120, the electromagnetic wave timepiece 1 starts the demodulation of the sync channel signal, and acquires initially demodulated data. Continuing, in step S125, the electromagnetic wave timepiece 1 infers a data area of a data string from the initially demodulated data, and controls a receiving operation in accordance with the data area. Details of this process will be described hereafter.

Next, in step S130, the electromagnetic wave timepiece 1 acquires all pieces of data in one data string (a sync channel message 2 in FIG. 5), from among the demodulated data of the sync channel signal, in order from the head of the data string (T3 to T4 in FIG. 5).

Next, in step S135, the electromagnetic wave timepiece 1 extracts the time information from fields including SYS_TIME which include the time information included in the acquired data string.

Next, in step S140, the electromagnetic wave timepiece 1 displays the extracted time information by converting it into a predetermined display format. By means of the above processes, the electromagnetic wave timepiece 1, as well as extracting the time information from the received signal, displays the extracted time information.

Figure 6:
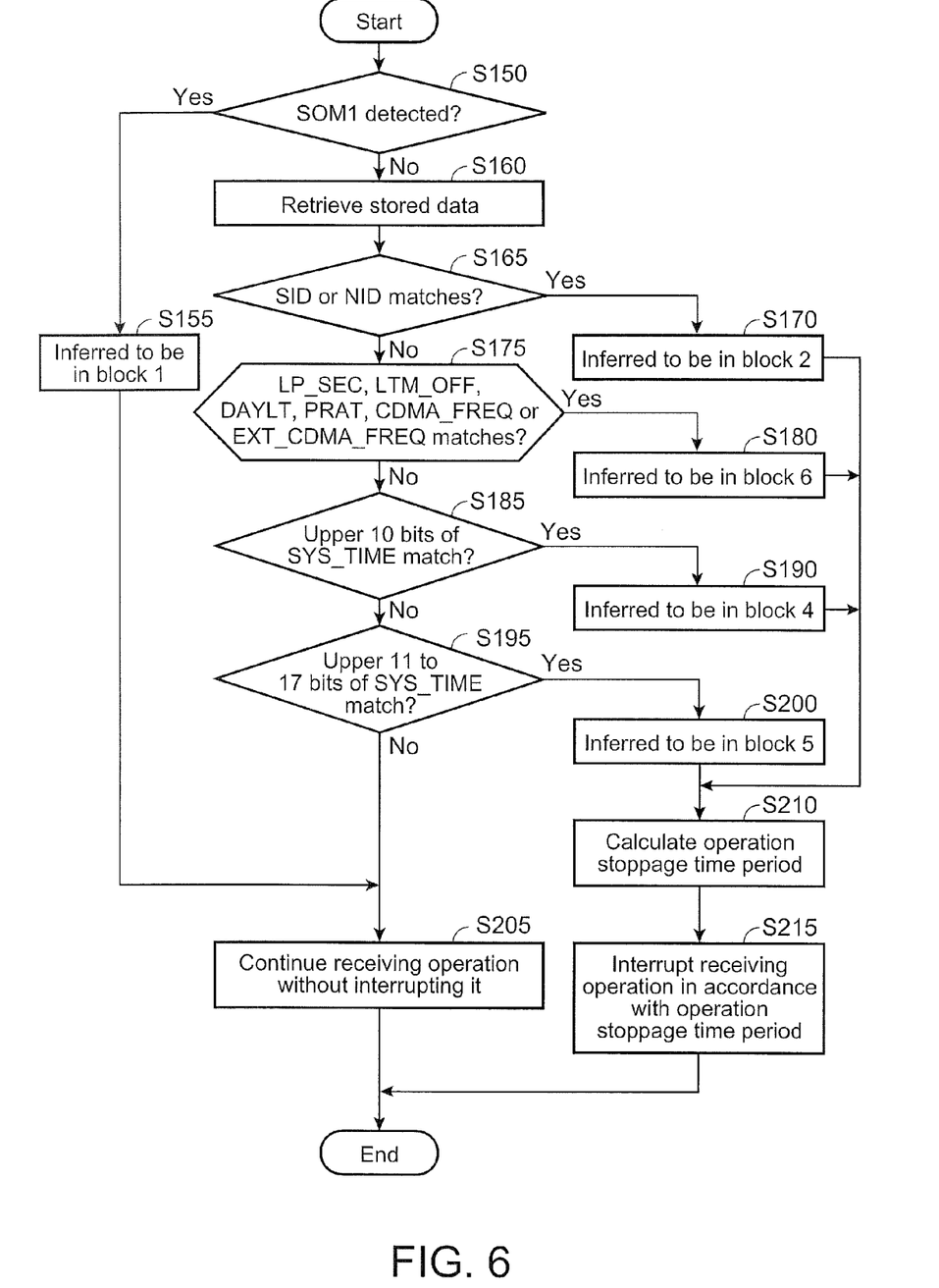
FIG. 6 is a flowchart illustrating a process of inferring a data area in a data string, and controlling a receiving operation in accordance with the data area in an embodiment 1.

FIG. 6 is a flowchart illustrating the details of the process of inferring the data area of the data string and controlling the receiving operation in accordance with the data area (step S125 in FIG. 4). When the process is started, first, in step S150, the electromagnetic wave timepiece 1 determines whether or not the bit (SOM1) indicating the head of the data strings of the message data can be detected from the initially demodulated data. Herein, if the SOM1 is detected (Yes in step S150), the electromagnetic wave timepiece 1 proceeds to step S155, infers that the initially demodulated data is in the block 1, and proceeds to step S205. Contrarily, if the SOM1 is not detected (No in step S150), the electromagnetic wave timepiece 1 proceeds to step S160, and retrieves the stored data in the reference data string.

Next, in step S165, the electromagnetic wave timepiece 1 determines whether or not a value of SID or NID in the reference data string matches the initially demodulated data. As SID and NID, being kinds of ID for identifying a communication carrier or the like, do not change due to the elapse of time, it is possible, by comparing bit patterns of SID and NID, to determine whether or not the initially demodulated data are in the block 2. As a result of the determination, if the value of SID or NID in the reference data string matches the initially demodulated data (Yes in step S165), the electromagnetic wave timepiece 1 proceeds to step S170, infers that the initially demodulated data are in the block 2, and proceeds to step S210. Contrarily, if the value of SID or NID in the reference data string does not match the initially demodulated data (No in step S165), the electromagnetic wave timepiece 1 determines that the initially demodulated data are not in the block 2, and proceeds to step S175.

Next, in step S175, the electromagnetic wave timepiece 1 determines whether or not a value of LP_SEC, LTM_OFF, DAYLT, PRAT, CDMA_FREQ or EXT_CDMA_FREQ in the reference data string matches the initially demodulated data. As the values of these fields do not change due to the elapse of time, it is possible, by comparing bit patterns of the values, to determine whether or not the initially demodulated data are in the block 6. As a result of the determination, if the values of the above-mentioned fields in the reference data string match the initially demodulated data (Yes in step S175), the electromagnetic wave timepiece 1 proceeds to step S180, infers that the initially demodulated data are in the block 6, and proceeds to step S210. Contrarily, if the values of the above-mentioned fields in the reference field do not match the initially demodulated data (No in step S175), the electromagnetic wave timepiece 1 determines that the initially demodulated data is in the block 6, and proceeds to step S185.

Next, in step S185, the electromagnetic wave timepiece 1 determines whether or not upper 10 bits of SYS_TIME in the reference data string match the initially demodulated data. Herein, as SYS_TIME is the field of which the data value fluctuates along with the elapse of time, but lower 10 bits of the block 4, indicating the upper 10 bits of SYS_TIME, are an area in which the data is not updated for approximately four months, it is possible, by using the area as a comparison object, to determine whether or not the initially demodulated data are in the block 4. As a result of the determination, if a value of the upper 10 bits of SYS_TIME in the reference data string matches the initially demodulated data (Yes in step S185), the electromagnetic wave timepiece 1 proceeds to step S190, infers that the initially demodulated data are in the block 4, and proceeds to step S210. Contrarily, if the value of the upper 10 bits of SYS_TIME in the reference data string does not match the initially demodulated data (No in step S185), the electromagnetic wave timepiece 1 determines that the initially demodulated data are not in the block 4, and proceeds to step S195. The determination as to whether or not the initially demodulated data is in the block 4 not being limited to the heretofore described method, it is also acceptable to calculate a bit string of SYS_TIME from a current time, and compare it with the initially demodulated data.

Next, in step S195, the electromagnetic wave timepiece 1 determines whether or not upper 11 to 17 bits of SYS_TIME in the reference data string match the initially demodulated data. Herein, in SYS_TIME, as upper 6 bits of the block 5, indicating the upper 11 to 17 bits of SYS_TIME, are an area in which the data is not updated for approximately one day, it is possible, by using the area as a comparison object, to determine whether or not the initially demodulated data are in the block 5. As a result of the determination, if a value of the upper 11 to 17 bits of SYS_TIME matches the initially demodulated data (Yes in step S195), the electromagnetic wave timepiece 1 proceeds to step S200, infers that the initially demodulated data are in the block 5, and proceeds to step S210. In step S210, the electromagnetic wave timepiece 1, in accordance with the inferred block, calculates an operation stoppage time period for which to halt the receiving operation. Continuing, in step S215, the electromagnetic wave timepiece 1 halts the receiving operation in accordance with the calculated operation stoppage time period (ΔT to T3 in FIG. 5), and finishes the series of processes.

Contrarily, if the value of the upper 11 to 17 bits of SYS_TIME in the reference data string does not match the initially demodulated data (No in step S195), the electromagnetic wave timepiece 1 determines that the initially demodulated data are not in the block 5, and proceeds to step S205. In step S205, the electromagnetic wave timepiece 1 continues the receiving operation without halting it, and finishes the series of processes. By means of the above processes, the electromagnetic wave timepiece 1, based on the initially demodulated data of the sync channel signal, infers the location in the data string of the relevant data, calculates the time period for which to halt the receiving operation, from the inferred location, and halts the receiving operation in accordance with the calculated time period. In the embodiment 1, if the initially demodulated data are in the block 1, the block 3, the block 7, the block 8 or the block 9, the receiving operation is not halted. Also, the determination as to whether or not the initially demodulated data is in the block 5 not being limited to the heretofore described method, it is also acceptable to calculate the bit string of SYS_TIME from the current time, and compare it with the initially demodulated data.

According to the heretofore described embodiment 1, the following advantage is achieved.

1. In the electromagnetic wave timepiece 1 supplied with power from a battery, as a power consumption can be reduced, a frequency of battery replacements is reduced. Particularly, in a case in which the electromagnetic wave timepiece 1 is applied to a portable telephone or a wrist watch, as it consumes less power, it is sufficient that a mounted battery is of a low capacity, meaning that the portable telephone and the wrist watch can be reduced in size and weight.

Embodiment 2

Figure 7:
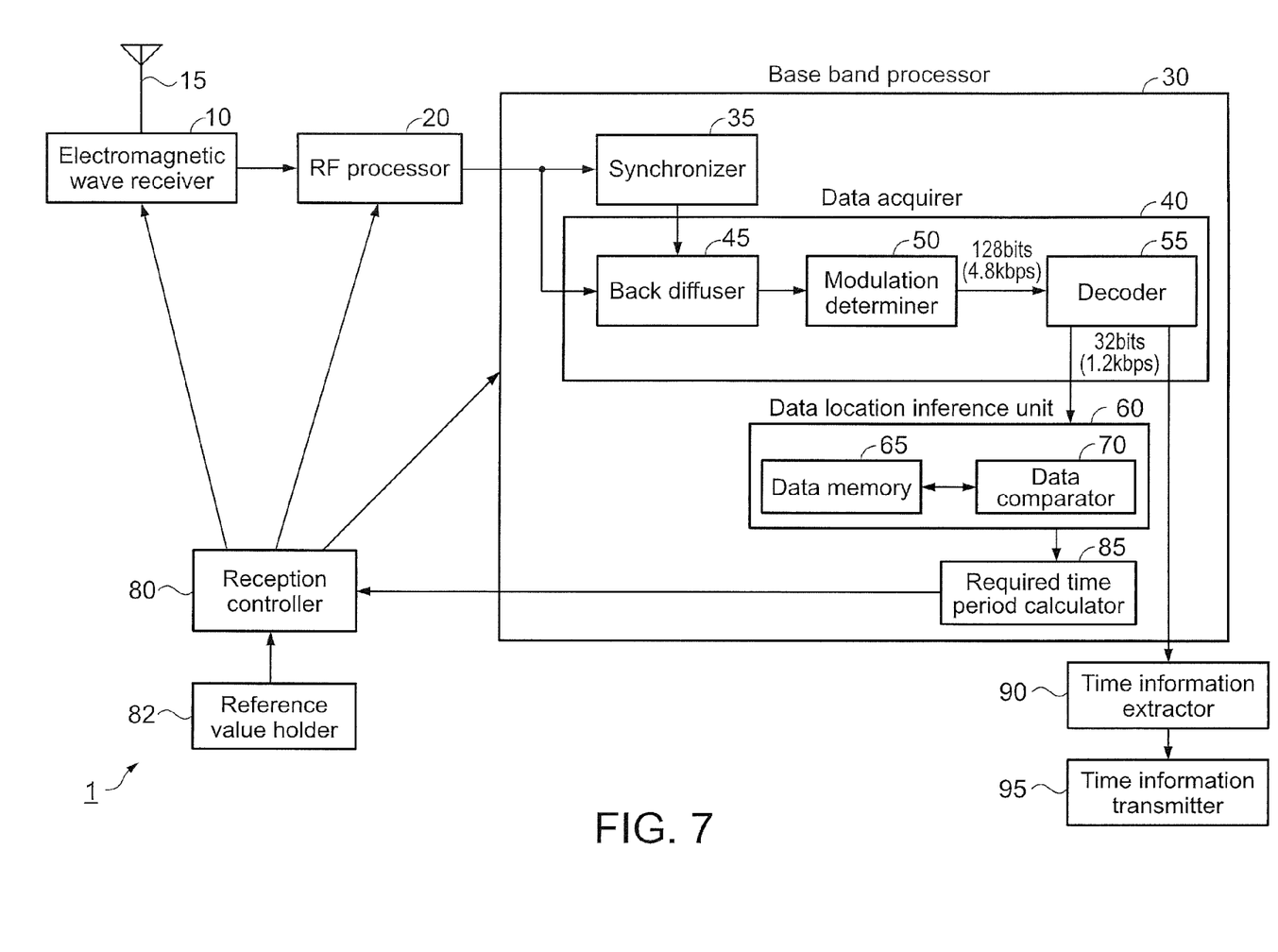
FIG. 7 is a block diagram showing a configuration of an electromagnetic wave timepiece according to an embodiment 2 of the invention.
Figure 8:
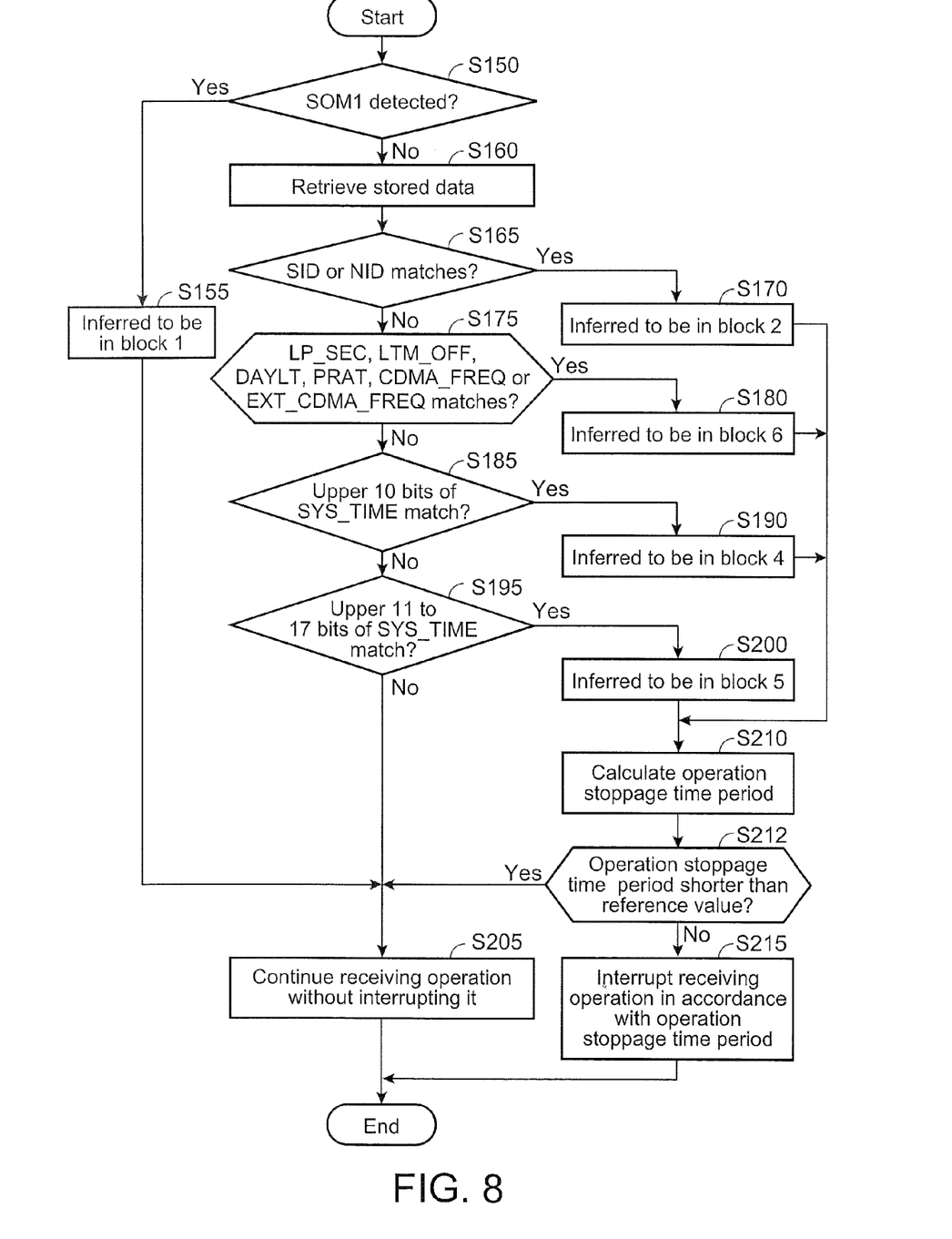
FIG. 8 is a flowchart illustrating a process of inferring a data area in a data string, and controlling a receiving operation in accordance with the data area, in the embodiment 2 of the invention.

Next, a description will be given of an embodiment 2 of the invention, with reference to FIGS. 7 and 8. In the following description, identical reference numerals will be affixed to the same portions as those already described, and a description will be omitted. FIG. 7 is a block diagram showing a configuration of an electromagnetic wave timepiece 1 to which is applied a receiving apparatus according to the embodiment 2. As shown in the same figure, the electromagnetic wave timepiece 1 of the embodiment 2 has added thereto a reference value holder 82 which holds a shortest stoppage time period, in comparison with the electromagnetic wave timepiece 1 of the embodiment 1. Herein, the shortest stoppage time period, being a shortest time period for which the receiving operation is halted by the reception controller 80, is set in advance. Also, FIG. 8 is a flowchart illustrating details of a process which, in the embodiment 2, infers a data area of a data string, and controls the receiving operation in accordance with the data area (step S125 in FIG. 4). In step S212 of the flowchart, the electromagnetic wave timepiece 1 compares the calculated operation stoppage time period and the shortest stoppage time period. Herein, if the operation stoppage time period is shorter than the shortest stoppage time period, which is a reference value (Yes in step S212), the electromagnetic wave timepiece 1 proceeds to step S205, and continues the receiving operation without halting it. Contrarily, if the operation stoppage time period is longer than the shortest stoppage time period (No in step S212), the electromagnetic wave timepiece 1 proceeds to step S215, and halts the receiving operation in accordance with the operation stoppage time period.

According to the heretofore described embodiment 2, the following advantage can be achieved in addition to the advantage 1 described in the embodiment 1.

2. In the event that the time period for which the receiving operation is halted is shorter than a predetermined shortest stoppage time period, as the receiving operation is not halted, it is possible to prevent a data acquisition error due to an operation delay when switching the receiving operation.

Embodiment 3

Figure 9:
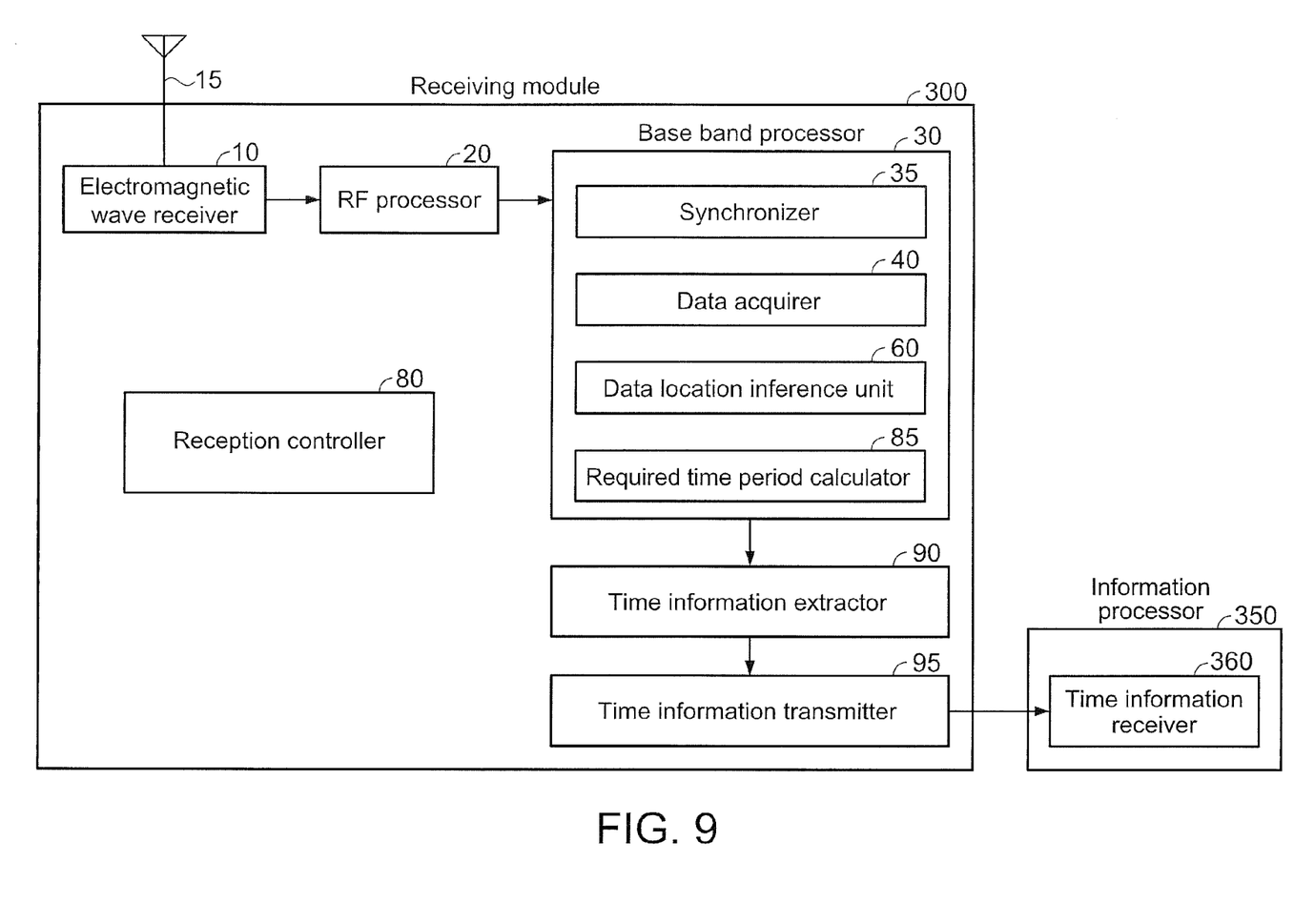
FIG. 9 is a block diagram showing a configuration of a receiving module according to an embodiment 3 of the invention.

Next, a description will be given of an embodiment 3 of the invention, with reference to FIG. 9. FIG. 9 is a block diagram showing a configuration of a receiving module 300 including each functional portion of the electromagnetic wave timepiece 1 described in the embodiment 1. It is acceptable that the receiving module 300 is either of an aspect in which it is integrated into one chip as in an integrated circuit, or an aspect in which it has a plurality of electronic parts mounted on a substrate. As the receiving module 300, the embodiment 3 employs each functional portion of the electromagnetic wave timepiece 1 described in the embodiment 1 but, without being limited to this, it is also acceptable to employ each functional portion of the electromagnetic wave timepiece 1 described in the embodiment 2. As well as the receiving module 300 being connected to an information processor 350, the time information transmitted from the time information transmitter 95 is input into a time information receiver 360, and the information processor 350 refers to the time information when needed.

As the information processor 350, the embodiment 3 assumes the following kinds of apparatus and application, but the configuration is not limited to them. It is also acceptable to employ any apparatus and application, as long as the apparatus is one which acquires the time information from the receiving module 300.

A timing for a picture recording reservation in a picture recorder

A viewing time measurement in a pay-broadcasting receiver

A trading implementation time determination in an electronic trading apparatus for securities such as stocks An official document creation date and time determination in a document creating apparatus A timing in a real-time clock incorporated in other apparatus In this way, by incorporating the receiving module 300 in the information processor 350, the information processor 350 can acquire accurate time information with a low power consumption.

The embodiments of the invention have been described with reference to the drawings, but a specific configuration, not being limited to these embodiments 1 to 3, also includes a design change or the like within a scope not departing from the spirit of the invention. For example, although it is assumed that a timing of demodulation comes at every SOM bit, the configuration being applicable even in a case of demodulation at a timing regardless of the SOM bits, it is also acceptable to, based on data, from among the message data, which change less frequently, infer a relevant location in the message.

The entire disclosure of Japanese Patent Application Nos. 2006-353824, filed Dec. 28, 2006 and 2007-243438, filed Sep. 20, 2007 are expressly incorporated by reference herein.

What is claimed is:

1. A receiving apparatus comprising:
   a receiver which receives a communication signal, transmitted from a base station by a predetermined communication method, which includes a pilot channel signal and a sync channel signal in which predetermined data strings continue periodically,
   a synchronizer which acquires synchronization information for communicating with the base station from the pilot channel signal included in the communication signal and, based on the acquired synchronization information, obtains synchronization with the communication signal,
   a data acquirer which demodulates the sync channel signal from the communication signal with which the synchronization has been obtained and, by decoding the demodulated sync channel signal, acquires data of the sync channel signal,
   an inference unit which, by comparing the acquired data with data, including the data string, which are acquired before the acquired data and held, infers a location in the data string of the acquired data,
   a calculator which, from the inferred location in the data string, calculates a time period required until receiving a head of a next data string, and
   a controller which, based on the calculated time period, controls a halt of an operation relating to the reception of the communication signal.

2. The receiving apparatus according to claim 1, wherein the inference unit includes
   a memory which stores the data string which acts as a reference, and
   a comparator which compares the acquired data and the stored data string.

3. The receiving apparatus according to claim 2, wherein the data string includes one data area which includes at least information relating to a time, and another data area in which data are less likely to be updated in response to an elapse of time, and
   the inference unit which determines whether or not the acquired data are included in the one data area by using a first area as a comparison object, and
   determines whether or not the acquired data are included in the other data area by using a second area as a comparison object,
   wherein
   the first area is included in the information relating to the time indicated by the acquired data and is less frequently updated, and
   the second area is included in information indicating a predetermined disposition pattern in the acquired data.

4. The receiving apparatus according to claim 1, wherein the controller, in the event that the calculated time period is shorter than a reference value, does not instruct the halt of the operation relating to the reception.

5. The receiving apparatus according to claim 1, wherein the predetermined communication method is a CDMA communication method.

6. An electromagnetic wave timepiece which receives a communication signal including the time information, comprising:
   the receiving apparatus according to claim 1.

7. A receiving module comprising:
   a receiver which receives a communication signal, transmitted from a base station by a predetermined communication method, which includes a pilot channel signal and a sync channel signal in which predetermined data strings continue periodically,
   a synchronizer which acquires synchronization information for communicating with the base station from the pilot channel signal included in the communication signal and, based on the acquired synchronization information, obtains synchronization with the communication signal,
   a data acquirer which demodulates the sync channel signal from the communication signal with which the synchronization has been obtained and, by decoding the demodulated sync channel signal, acquires data of the sync channel signal,
   an inference unit which, by comparing the acquired data with data, including the data string, which are acquired before the acquired data and held, infers a location in the data string of the acquired data, a calculator which, from the inferred location in the data string, calculates a time period required until receiving a head of a next data string, and a controller which, based on the calculated time period, controls a halt of an operation relating to the reception of the communication signal.

8. A receiving method comprising:

receiving a communication signal, transmitted from a base station by a predetermined communication method, which includes a pilot channel signal and a sync channel signal in which predetermined data strings continue periodically, acquiring synchronization information for communicating with the base station from the pilot channel signal included in the communication signal and, based on the acquired synchronization information, obtaining synchronization with the communication signal, demodulating the sync channel signal from the communication signal with which the synchronization has been obtained and, by decoding the demodulated sync channel signal, acquiring data of the sync channel signal, by comparing the acquired data with data, including the data string, which are acquired before the acquired data and held, inferring a location in the data string of the acquired data, from the inferred location in the data string, calculating a time period required until receiving a head of a next data string, and based on the calculated time period, controlling a halt of an operation relating to the reception of the communication signal.

* * * * *